(12) United States Patent
Hind et al.

(10) Patent No.: US 7,039,644 B2
(45) Date of Patent: May 2, 2006

(54) PROBLEM DETERMINATION METHOD, SYSTEM AND PROGRAM PRODUCT

(75) Inventors: John R. Hind, Raleigh, NC (US); Douglas N. Kimelman, Hawthorne, NY (US); Vincent J. Kruskal, Harrison, NY (US); Harold L. Ossher, South Salem, NY (US); Bala Rajaraman, Cary, NC (US); Tova Roth, Woodmere, NY (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 10/244,865

(22) Filed: Sep. 17, 2002

(65) Prior Publication Data

US 2004/0054695 A1 Mar. 18, 2004

(51) Int. Cl.
*G06F 17/00* (2006.01)
(52) U.S. Cl. .................... 707/101; 707/103 Y; 717/118
(58) Field of Classification Search ................ 707/101, 707/102, 103 R, 103 X, 103 Y, 103 Z, 202; 717/118, 140, 148
See application file for complete search history.

(56) References Cited

U.S. PATENT DOCUMENTS 5,392,432 A * 2/1995 Engelstad et al. ...... 707/103 R
6,145,121 A * 11/2000 Levy et al. ................. 717/135
6,324,543 B1   11/2001 Cohen et al.
6,434,575 B1 *  8/2002 Berry et al. ................. 707/206
6,694,507 B1 *  2/2004 Arnold et al. ............... 717/108
6,708,169 B1 *  3/2004 Berry et al. .................... 707/7
6,826,746 B1 * 11/2004 Evans et al. ................. 717/124
2002/0059326 A1 *  5/2002 Bernhart et al.
2003/0149960 A1 *  8/2003 Inamdar ...................... 717/118

OTHER PUBLICATIONS

"HyperProbe—An Aspect-Oriented Instrumentation Tool for Troubleshooting Large-Scale Production Systems,"1st International Conference on Aspect-Oriented Software Development, University of Twente, Enschede, The Netherlands, Apr. 22-26, 2002, abstract.
"HyperJ," Jan. 2000, http://www.alphaworks.ibm.com/tech/hyperj.
N. Lesiecki, "Improve modularity with aspect-oriented programming," Jan. 2002, http://www-106.ibm.com/developerworks/java/library/j-aspect/index.html.

* cited by examiner

*Primary Examiner*—Greta Robinson
(74) *Attorney, Agent, or Firm*—Hoffman, Warnick & D'Alessandro, LLC; Jerry W. Herndon

(57) ABSTRACT

A problem determination method, system and program product are provided. Specifically, the present invention identifies problems with software programs by inserting compiled problem determination probes into program classes while the computer system on which the program is loaded is running. Once the probes have been inserted, the classes will be run and trace data will be generated. The trace data can be retrieved and analyzed to identify and address the problem. When the probes are no longer needed, they can be removed while the computer system continues to run.

33 Claims, 5 Drawing Sheets

```
┌─────────────────────────────────────┐
│ RECEIVE PROBLEM DETERMINATION       │ 202
│ PROBES AND ASSOCIATED               │
│ INSTRUCTIONS ON A COMPUTERIZED      │
│ SYSTEM.                             │
└─────────────────────────────────────┘
                  │
                  ▼
┌─────────────────────────────────────┐
│ ACTIVATE THE PROBLEM                │ 204
│ DETERMINATION PROBES IN A           │
│ FRAGMENT DATABASE.                  │
└─────────────────────────────────────┘
                  │
                  ▼
┌─────────────────────────────────────┐
│ IDENTIFY PROGRAM CLASSES INTO       │ 206
│ WHICH THE PROBLEM DETERMINATION     │
│ PROBES SHOULD BE INSERTED BASED ON  │
│ THE INSTRUCTIONS.                   │
└─────────────────────────────────────┘
                  │
                  ▼
┌─────────────────────────────────────┐
│ INSERT THE ACTIVATED PROBLEM        │ 208
│ DETERMINATION PROBES INTO THE       │
│ IDENTIFIED PROGRAM CLASSES WHILE    │
│ THE COMPUTERIZED SYSTEM IS          │
│ RUNNING.                            │
└─────────────────────────────────────┘
                  │
                  ▼
┌─────────────────────────────────────┐
│ EXECUTE THE PROGRAM CLASSES WITH    │ 210
│ THE INSERTED PROBLEM                │
│ DETERMINATION PROBES TO GENERATE    │
│ TRACE DATA.                         │
└─────────────────────────────────────┘
```

PROBLEM DETERMINATION METHOD, SYSTEM AND PROGRAM PRODUCT

BACKGROUND OF THE INVENTION

1. Field of the Invention

The present invention generally relates to a problem determination method, system and program product. Specifically, the present invention allows problem determination probes to be inserted into program classes of a running object-oriented runtime environment under the direction of a dynamic work flow derived from a collection of on-line knowledge bases.

2. Background Art

In the production of software, problem determination is the process of identifying the cause of either a system failure or the cause of a system not behaving as expected. Typically, problem determination results in the finding of a configuration error, an improper use of an application programming interface, a product defect, or some other root cause. There have been numerous advances in problem determination for the situation where the software is still being run on a platform under the control of the software producer. In these environments there are many successful approaches for diagnosing failure, and the approaches typically rely on the use of test cases and debugging tools to isolate problems. This type of problem determination is commonly known as "debugging."

Unfortunately, very little progress has been made in problem determination when a shipped software product has been installed in a production environment at a customer's site. Problem determination in this situation (e.g., known as troubleshooting) becomes especially difficult when a failure occurs in a customer business process that involves multiple products. This difficulty exists even if several of the products come from the same software provider. In this environment, the customer's personnel (e.g., an administrator) with access to the failing production platform (which may be multiple computers in a network running various inter-working software products) generally attempt to address the failure. However, such administrators traditionally have a poor communications channel with the product support personnel as well as an ill-defined process for reaching a successful conclusion of eliminating the failure.

One relevant characteristic in "troubleshooting" is the fact that a majority of product support requests from customers are resolved without identifying a product defect. In actuality, failures more often result from misleading documentation, improper configuration, improper installation, unidentified dependencies, or the flow of work between products. Another relevant characteristic is the disjointed flow of diagnostic information between the suspected failing component and the respective service personnel by way of the customer administrator. Specifically, "troubleshooting" is often accompanied by several rounds of "telephone tag" intermixed with overnight shipments of large traces and dumps of data. Moreover, the service personnel are typically limited in their response to using the problem determination capabilities built into the product by its development team. These capabilities consist of the product development support originally built into the product, which often are limited to trace levels of support with a few levels of generic controls. This can lead to generation of large volumes of output and consumption of so many resources that the customer must schedule capture of the requested information in non-prime time hours.

In the past, some attempts have been made, particularly at the hardware/micro code level, to directly connect a failing machine with its manufacturer's service personnel. This arrangement has met with much resistance from customers who view this capability as a security problem. Specifically, many customers are concerned that they are unable to control the flow of information and fear that business information may be unnecessarily disclosed during the diagnostic process. To this extent, it is not unusual for today's product service personnel to receive dumps/traces of data from a customer's administrator in printed format with certain contained business information blacked out, or to find that the information was generated on a non-production system using non-confidential test data. Such activities not only lengthen the resolution, but also often mask the problem.

In view of the foregoing, there exists a need for an improved problem determination method, system and program product. To this extent, a need exists for an automated "troubleshooting" process that smooths the flow of diagnostic information and allows the knowledge accumulated by the product service group from previous support engagements to be used in the automation scheme. A further need exists for such a problem determination scheme to be implemented while the subject computer system(s) remains running.

SUMMARY OF THE INVENTION

In general, the present invention provides a problem determination method, system and program product. Specifically, the present invention allows a distributed set of knowledge bases at vendor support sites to drive a dynamic work flow on an administrative system at a customer's site. The administrative system will utilize the results of problem determination probes inserted, executed and removed from various object-oriented execution environments of a failing customer solution to identify and address solution problems.

The present invention provides a virtual machine that includes an injection system, a class loader and a log system. Problem determination probes and associated rules are received by the injection system. The injection system then generates class recognition logic based on the rules, compiles the probes and logic into bytecode, and then stores the compiled probes, rules and compiled logic in a fragment database. The class loader will then load and/or reload the appropriate program classes with any activated probes. Once run, the classes with the inserted probes will generate trace data to a log database, which can be retrieved and analyzed via the log system.

According to a first aspect of the present invention, a problem determination method is provided. The method comprises: (1) receiving problem determination probes and associated instructions on a computerized system; (2) activating the problem determination probes in a fragment database; (3) identifying program classes into which the problem determination probes should be inserted based on the instructions; (4) inserting the activated problem determination probes into the identified program classes while the computerized system is running; and (5) executing the program classes with the inserted problem determination probes to generate trace data.

According to a second aspect of the present invention, a problem determination system is provided. The system comprises: (1) an injection system having a storage system for storing problem determination probes and associated instructions in a fragment database, and an activation system for activating the stored problem determination probes; (2) a class loader having a query system for querying the fragment database to identify unloaded program classes into which the problem determination probes should be injected, and an insertion system for inserting the activated problem determination probes into the identified unloaded classes; and (3) a log system for accessing trace data in a log database, wherein the trace data is produced when program classes having the inserted problem determination probes are loaded and executed.

According to a third aspect of the present invention, a virtual machine for problem determination is provided. The virtual machine comprises: (1) an injection system for receiving problem determination probes and associated instructions, for generating class recognition logic based on the associated instructions, for compiling the problem determination probes and the class recognition logic into virtual instructions, for storing compiled problem determination probes, the associated instructions and the compiled class recognition logic in a fragment database, and for activating predetermined compiled problem determination probes in the fragment database; (2) a class loader for querying the fragment database to identify unloaded program classes into which the compiled problem determination probes should be injected, and for and inserting the activated problem determination probes into the identified unloaded classes; and (3) a log system for accessing trace data in a log database, wherein the trace data is produced when the unloaded program classes having the inserted problem determination probes are loaded and executed.

According to a fourth aspect of the present invention, a program product stored on a recordable medium for problem determination is provided. When executed, the program product comprises: (1) an injection system having program code for storing problem determination probes and associated instructions in a fragment database, and program code for activating the stored problem determination probes; (2) a class loader having program code for querying the fragment database to identify unloaded program classes into which the problem determination probes should be injected, and program code for inserting the activated problem determination probes into the identified unloaded classes; and (3) a log system having program code for accessing trace data in a log database, wherein the trace data is produced when program classes having the inserted problem determination probes are loaded and executed.

According to a fifth aspect of the present invention, a problem determination method is provided. The method comprises: (1) receiving problem determination probes and associated rules from a computerized support system to a computerized administrator system; (2) providing the problem determination probes and associated rules to a computer customer system from the computerized administrator system; (3) activating the problem determination probes in a fragment database of the customer system; (4) inserting the activated problem determination probes into program classes based on the instructions while the computerized customer system is running; and (5) executing the program classes with the inserted problem determination probes to generate trace data.

Therefore, the present invention provides a problem determination method, system and program product.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a method flow diagram according to the present invention.

Figure 1:
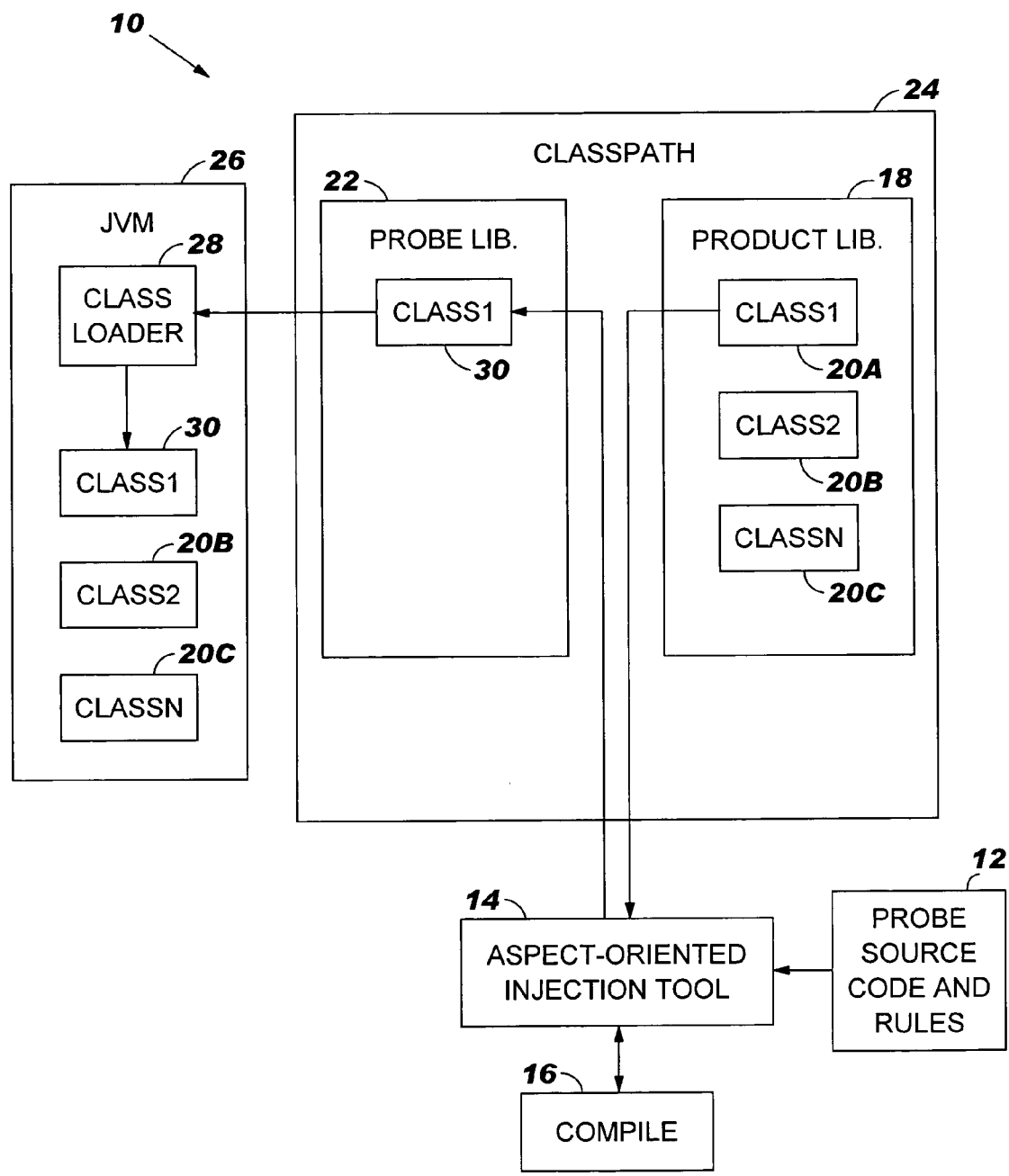
FIG. 1 depicts a related art problem determination system.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAIL DESCRIPTION OF THE INVENTION

For clarity purposes, the Detailed Description of the Invention will have the following sections:

I. Background

A. Aspect-Oriented Programming

B. Aspect-Oriented Debugging

II. Present Invention

I. Background

A. Aspect-Oriented Programming

When using standard procedural or Object-Oriented programming (OOP) languages it can be difficult to modularize design concerns such as error-checking, synchronization policies, resource sharing, etc. Not only do these types of concerns tend to affect multiple modules, but because of the way they cross module boundaries it could be stated that they crosscut the program structure. Aspect-Oriented programming (AOP) is a methodology developed for the modularization of crosscutting concerns "Aspects" are units of software modularity that cleanly encapsulate crosscutting concerns. That is, "aspects" make the structure of the crosscutting concerns more clear and easy to reason. "Aspects" also make the interaction between the crosscutting concerns and the primary modularity clear. One of the best know implementations of AOP for the JAVA environment is known as "AspectJ." In it's current form, "AspectJ" allows fragments of JAVA code to be inserted into methods of JAVA classes at the source code level using a pattern specification.

One commonly used debug technique, especially in Object-Oriented systems where it is often not clear to a developer what the overall system flow looks like, is to insert print statements into the source code. In the International Business Machines Corp. Developer Works article entitled "AspectJ brings AOP to the Java language" (found on the web at www106.ibm.com/developerworks/JAVA/library/j-aspectj/index.html), AOP and "AspectJ" are intro duced by showing just such an example which is summarized in the following code:

```
// from package test
Public Class Logging{
    public void foo( ){}
public static void main(String[ ] args){
    Logging ap = new Logging( );
    Ap.foo( ); }
}
public aspect AutoLog{
pointcut publicMethods( ) : execution(public * test..*(..));
pointcut logObjectCalls( ) : execution(* Logger.*(..));
pointcut loggableCalls( ) : publicMethods( ) && ! logObjectCalls( );
 before( ) : loggableCalls( ){
   Logger.entry(thisJoinPoint.getSignature( ).toString( ));
 }
 after( ) : loggableCalls( ){
   Logger.exit(thisJoinPoint.getSignature( ).toString( ));
 }
}
Class Logger{
   public static void entry(String message){
           System.out.println("entering method: " + message);
       }
   public static void exit(String message){
           System.out.println("exiting method: " + message);
       }
}
entering method: void test.Logging.main(String[ ])
entering method: void test.Logging.foo( )
exiting method: void test.Logging.foo( )
exiting method: void test.Logging.main(String[ ])
```

From the above code it can be seen that an AOP environment can significantly enhance debugging by providing an easy way of inserting and then removing probes (e.g., sets of print statements) into the objects of a system to generate a flow trace. Unfortunately, "AspectJ" relies on the availability of full source code and a build environment. As such, it can be used in only a small subset of problem determination situations.

B. Aspect-Oriented Debugging

Recently, an AOP instrumentation tool has been introduced that allow "aspects" to be applied to test environments where neither the full source code of the product being debugged nor a full product build environment is available. Referring now to FIG. 1, such a tool is shown. In general, system 10 allows developer service personnel to take control of a customer's system to insert and remove probes (e.g., sets of print statements) into the code. Specifically, probes and rules 12 are received by injection tool 14. Once received, the probes are compiled by compiler 16 into bytecode, which are inserted into the binary files of product library 18. Specifically, the compiled probes are inserted into the appropriate classes 20A–C by injection tool 14, as designated by the rules while Java Virtual Machine (JVM) 26 is shut down. As shown in FIG. 1, probes were inserted only into class 20A, which was saved as a new binary file 30 in probe library 22 of classpath 24. When JVM 26 is restarted, class loader 28 will instantiate the product using the modified class 30 and classes 20B–C. When the test is complete, JVM 26 must be shut down to remove the probes and then restarted. As is apparent, both insertion and removal of the probes requires rebooting the JVM . Such a requirement is both inconvenient to the customer and inefficient for the service personnel.

II. Present Invention

The present invention addresses the issues with related art systems by providing a scheme for inserting problem determination probes into program classes while the subject system is running. Specifically, under the present invention, the problem determination probes are injected into the runtime of an object-oriented execution environment of a customer's system that interprets and/or incrementally compiles an intermediate virtualized instruction representation of that environment's object logic. One example of such an environment is JAVA where the intermediate virtual instructions resulting from compilation of source instructions are known as "bytecodes," which at run-time are loaded into a Java Virtual Machine (JVM) by a class loader. Once loaded, the bytecodes are directly interpreted and/or incrementally compiled by a just-in-time (JIT) compiler into native code for execution. It should be understood, however, that although JAVA terminology will be used in the following description, the teachings described herein could be applied in any environment.

Figure 2:
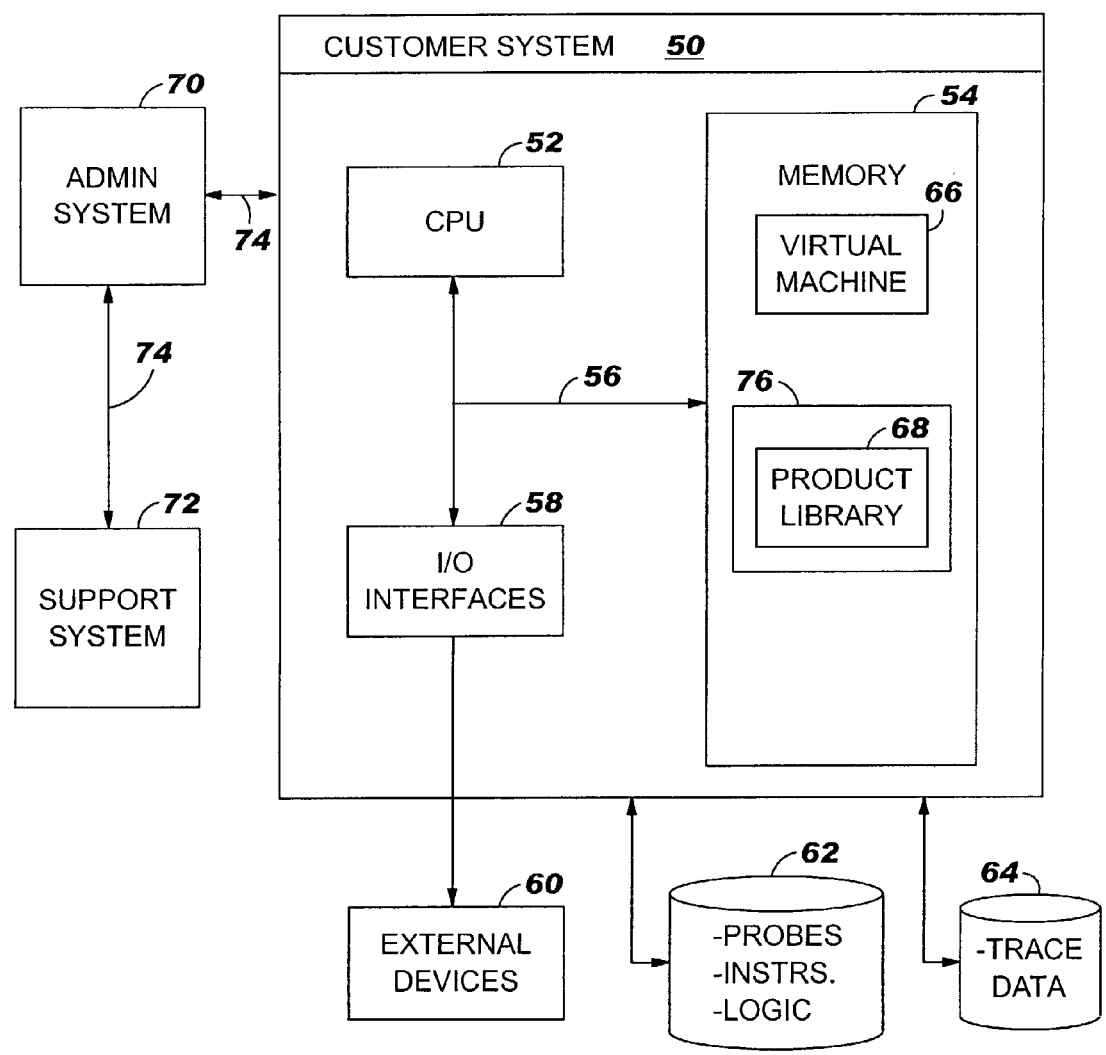
FIG. 2 depicts a computerized customer system having a virtual machine, according to the present invention.

Referring to FIG. 2, computerized customer system 50 according to the present invention is shown. Customer system 50 is intended to be representative of a computer system running a program 76 that malfunctions or fails to perform as expected. As depicted, customer system 50 generally includes central processing unit (CPU) 52, memory 54, bus 56, input/output (I/O) interfaces 58, external devices/resources 60, fragment database 62 and log database 64. CPU 52 may comprise a single processing unit, or be distributed across one or more processing units in one or more locations, e.g., on a client and server. Memory 54 may comprise any known type of data storage and/or transmission media, including magnetic media, optical media, random access memory (RAM), read-only memory (ROM), a data cache, a data object, etc. Moreover, similar to CPU 52, memory 54 may reside at a single physical location, comprising one or more types of data storage, or be distributed across a plurality of physical systems in various forms. I/O interfaces 58 may comprise any system for exchanging information to/from an external source. External devices/resources 60 may comprise any known type of external device, including speakers, a CRT, LED screen, hand-held device, keyboard, mouse, voice recognition system, speech output system, printer, monitor, facsimile, pager, etc. Bus 56 provides a communication link between each of the components in customer system 50 and likewise may comprise any known type of transmission link, including electrical, optical, wireless, etc. In addition, although not shown, additional components, such as cache memory, communication systems, system software, etc., may be incorporated into customer system 50.

Fragment database 62 and log database 64 may provide storage for information necessary to carry out the present invention. Such information could include, among other things, probes, class recognition logic and rules for fragment database 62, and trace data for log database 64. As such, databases 62 and 64 may include one or more storage devices, such as a magnetic disk drive or an optical disk drive. In another embodiment, databases 62 and 64 includes data distributed across, for example, a local area network (LAN), wide area network (WAN) or a storage area network (SAN) (not shown). Databases 62 and 64 may also be configured in such a way that one of ordinary skill in the art may interpret it to include one or more storage devices. It should be understood customer system 50 is intended to be representative of any type of computerized system. Examples include a server, a client, a workstation, a laptop, a personal digital assistant, etc.

Stored in memory 54 of customer system 50 is virtual machine 66 (i.e., a JAVA Virtual Machine) and product library 68. Virtual machine 66 will be further described below in conjunction with FIG. 3, but in general, virtual machine 66 includes systems for receiving and inserting probes into particular program classes and creating trace data for analysis while customer system 50 remains running. It should be understood that as known in the art, a virtual machine is software that acts as an interface between binary code and the microprocessor. It should be further understood that product library 68 is typically contained within a classpath (not shown in FIG. 2). Moreover, product library 68 is shown loaded in memory 54 for illustrative purposes only and other variations exist. For example, product library 68 and the classpath could be stored external to customer system 50 and accessed as needed.

As further shown in FIG. 2, customer system 50 communicates with computerized administrator system 70, which communicates with computerized support system 72. Administrator system 70 is intended to be representative of a customer's administrator who is troubleshooting a problem with software program 76 loaded on customer system 50. Support system 72 is intended to be representative of the developer of the malfunctioning software program who can be consulted by administrator system 70. Typically, administrator system 70 will provide probes and rules to customer system 50. Such probes, rules and other information could be made available to administrator system 70 by support system 72 based on historical data and experiences. Although not shown, it should also be appreciated that administrator system 70 and support system 72 include computerized components similar to customer system 50. Such components have not been shown for brevity purposes only.

Communication among customer system 50, administrator system 70 and support system 72 occurs via communications links 74. Communications links 74 are intended to represent any possible method of communication. For example, communication could occur via a direct hardwired connection (e.g., serial port), or via an addressable connection (e.g., remotely) in a client-server (or server-server) environment. In the case of the latter, the server and client may be connected via the Internet, wide area networks (WAN), local area networks (LAN) or other private networks. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server. Typically, customer system 50 and administrator system 70 are part of the same private network (LAN, WAN, VPN, etc.), while support system 72 is external to that network and is accessed via the Internet. Moreover, it should be appreciated that customer system 50, administrator system 70 and support system 72 could each include more than one computer system.

Figure 3:
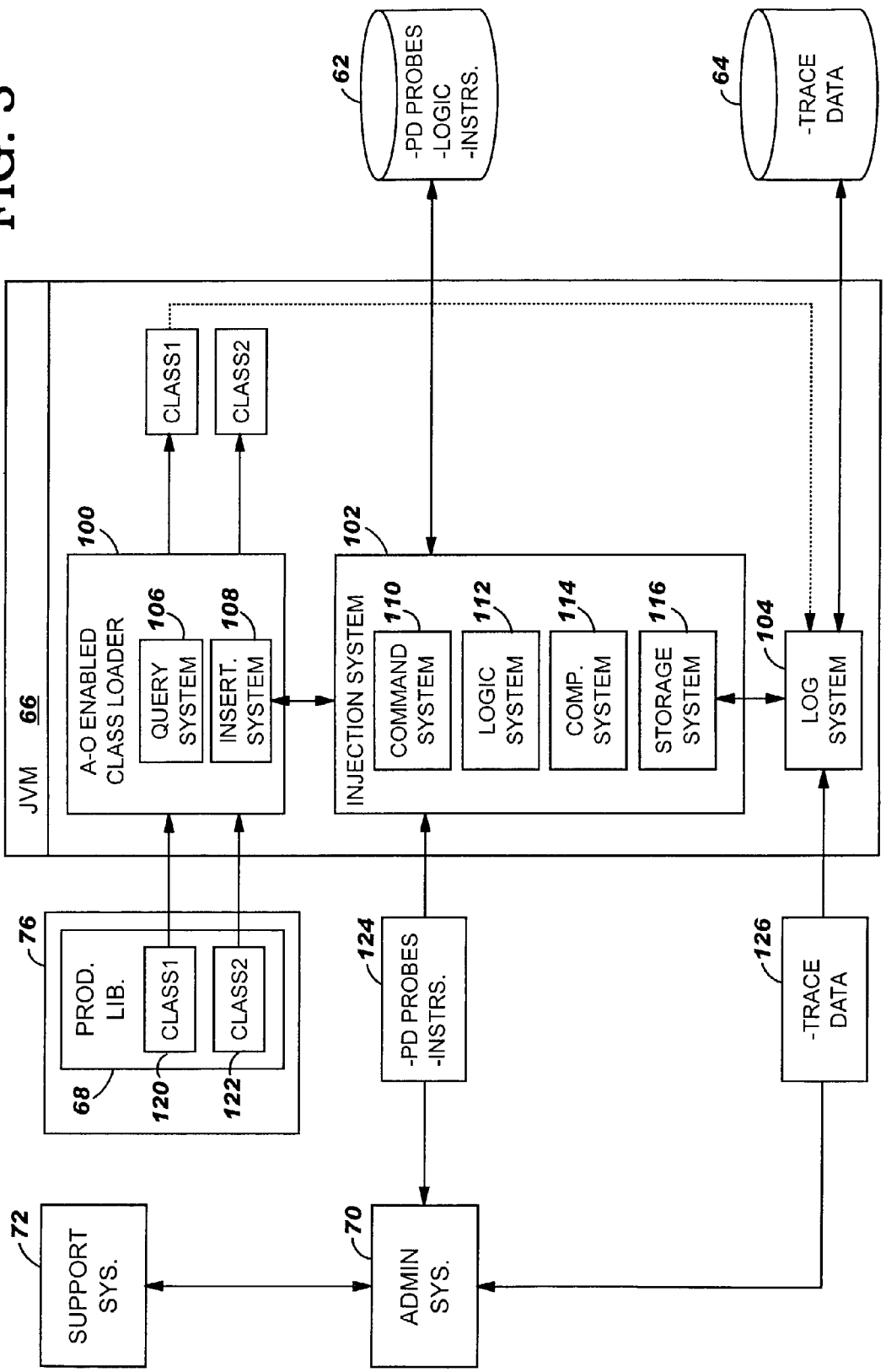
FIG. 3 depicts a more detailed diagram of the virtual machine of FIG. 2.

Referring now to FIG. 3, an exemplary embodiment of virtual machine 66 is shown. As depicted, virtual machine 66 includes Aspect-Oriented enabled class loader (module) 100, injection system/module 102 and log system/module 104. As will be further described below, injection system 102 and log system 104 generally include interfaces for issuing requests and retrieving trace data. Specifically, when a problem with program 76 is suspected (e.g., based on the knowledge base provided in the support system 72 augmentation of the dynamic problem determination work flow executing in the administration system 70), a "define"

request is issued via command system 110 of injection system 102 (e.g. by administrator system 70 or some other entity). Typically, the "define" request includes probes and associated instructions 124 that are received by command system 110 for processing. In general, each probe includes one or more probe points that are inserted into methods within one or more product classes 120, 122. A typical type of probe point is a print statement that will cause some form of trace data to be printed to log database 64. The associated rules indicate into which methods and classes the probes are to be inserted. For example, a rule could indicate that a probe is to be inserted into any class having "ABC" in its name, and has a method that has the string "set" in its name, and takes a parameter of a "widget." Thus the rules associate the probes with specific classes. Once the rules and probes have been received, logic system 112 will generate class recognition logic based on the rules. The class recognition logic will aid in identifying classes that have already been loaded but need to have the probes inserted (as will be further described below). In general, the logic is generated by parsing the rules to create a list of patterns that match all of the specific classes that require the probes and converting this into source code that, when compiled, may be executed by class loader 100.

Once the class recognition logic has been generated, compilation system (compiler) 114 will compile the probes and logic into virtual instructions (i.e., bytecode). Because the probes are compiled prior to insertion, the source code does not need to be recompiled after insertion. Accordingly, the full source code is not needed under the present invention to test individual pieces of program 76. Once the probes and logic have been compiled into virtual instructions (bytecode), they will be stored in fragment database 62 along with the rules. The compiled probes (i.e., probe fragments) will then be inserted into the classes identified by the associated rules. Specifically, particular probes will be activated (e.g., by an administrator) in fragment database 62 via command system 110. As class loader 100 is preparing to load classes 120 and 122 from product library 68, query system 106 will query fragment database 62 to determine if any stored probes have been activated for insertion. If so, insertion system 108 will insert the probes into the corresponding classes (as determined by the logic and rules in fragment database 62).

In addition to inserting probes into previously unloaded classes, the present invention provides the capability to insert probes into classes that have already been loaded. Specifically, logic system 112 will retrieve the class recognition logic from fragment database 62 and communicate the same to class loader 100. The class recognition logic typically includes a list of classes that need to have probes inserted. Class loader 100 will review the list and determine whether any classes that have already been loaded without probes match any of the classes on the list. If so, class loader 100 will unload and reload the classes while inserting the appropriate probes. For example, if class 120 has already been loaded when the probes are activated, class 120 will be unloaded and then reloaded with the activated probes.

Once the probes have been loaded in the appropriate classes, the classes/program will be run/executed. As indicated above, each probe typically includes one or more print statements dictating that some form of trace data to be printed to log database 64. However, it should be understood that many types of probes and/or combinations of probes could be implemented hereunder, and the present invention is not limited to the use of print statement types of probes. For example, a probe could add context or identifying (e.g., troubleshooting) information (e.g., thread id., web request details, etc.) to a database connection when it is acquired/created. The context information will be flowed across the connection when requests are made to the database (i.e., over the connection). This allows the probes on the database "side" to provide valuable context/correlation information. To this extent, the present invention could insert probe combinations (e.g. a probe on the application server "side" and a probe on the database server "side," that operate in conjunction with each other) and different types of probes (e.g., probes that consist of print statements as well as probes that consist of statements that add troubleshooting information) to provide effective problem determination of a system.

As further depicted in FIG. 3, when run, class 120 communicated trace data to log system 104, which in turn indexed the trace data in log database 64. The trace data 126 could then be retrieved for analysis from log database 64 via log system 104. Once the testing is complete, the probes could be deactivated via command system 110, and then removed along with the associated rules, class recognition logic and trace data. Removal generally occurs with a "removal" request issued via command system 110. All of these steps, receipt, insertion and removal of probes as well as review/removal of trace data are performed while virtual machine 66 and customer system 50 continue to run. That is, shutdown and reboot of either virtual machine 66 or customer system 50 is not necessary.

Under the present invention, all requests to the injection system 102 could contain a Globally Unique IDentifier (GUID), which is used to manage fragments (e.g., compiled probes and/or compiled logic) and to identify messages/trace data generated by the inserted probes and left in log database 64. The GUID is specified as a reserved substitution symbol in a preamble of the source aspect definition and, hence, like other substitution symbols (the use of which will be further describe below) can be used in the actual JAVA source code fragment (probes). Under the present invention, injection system 102 supports four basic requests/operations (define, activate, deactivate, remove), which were generally described above. During the "define" operation, the probes and associated rules are provided containing a GUID. After logic generation, and compilation, the rules, probes and logic are indexed in fragment database 64 according to GUID. As indicated above, the rules allow the specification of a "class.method" string with a match any single or multiple character place holders (our examples will use "?" for match single and "*" for match multiple for example "*.zip.crc*.get*" would match "JAVA.util.zip.crc32.getValue") and indicate the relative placement of the fragment (e.g., "after=*.zip.crc*.get*"). There are several existing database methods for efficiently indexing an entity by a pattern such that presentation of a string will retrieve the entities with a matching pattern, any of which may be implemented under the present invention here. One final step in the define stage paves the way for subsequent operation of the activate/deactivate requests by compiling the class portion of the patterns into a recognizor method (class recognition logic) which is also stored in fragment database 62.

The "activate" request accepts a GUID and moves the respective rules into the online index, it then passes the class recognition logic (last step of define) to class loader 100 which invalidates the code of any previously loaded classes that match the recognizor and reloads these. When reloading (or loading for the first time) class loader 100 performs a merge of the bytecodes found in the respective class from the respective product library 68 in the class path with all fragments found from a fragment database 62 query on the respective 'class.method' in the online index being operated on.

During activation, various issued could be addressed. For example, the previously loaded bytecode could be locked so that the code is clear of actively executing threads when the replacement of the bytecode occurs. Moreover, it should also be ensured that the invariants on inter-invocation object state don't change or become violated. It should also be verified that the inserted probe code does not add instance variables.

When issued, the "deactivate" request accepts a GUID and moves the respective rules to the off-line index and passes the class recognition logic to the class loader 100 causing the respective fragments to be removed by way of a reload of matching in-memory class code. The "remove" request forces a "deactivate" and then purges the fragment database 62 of all entries with the corresponding GUID.

There may be certain restrictions on the kind of code that can appear in the probes since it must be possible to activate/deactivate the probes without impacting the data associated with instances of the respective class that may be active at the time of the respective request. When the present invention is used to patch problems (described in further detail below), the GUID of the respective aspect definition becomes the handle by which the patch is removed by the service pack installer. In this case the service pack contains a list of GUIDs corresponding to patches for which the distributed code contains a permanent fix.

As indicated above, log system 104 provides a standard way of retrieving and purging the results of probes inserted into a platform. When possible, log system 104 uses the underlying logging facilities which may be present in a given implementation such as that provided by the standard JAVA class libraries of recent JAVA versions. Under the present invention, a probe log method is provided, which exposes specific parameters that a probe (fragment) must supply, such that there is uniformity in the information flow. These include the GUID of the probe, and a short message identification to facilitate results checking. The method also captures the time/date at which it is called as well as the "class.method" of the fragment making the request. Log system 104 allows all messages created by the above method to be retrieved using the corresponding GUID in conjunction with an optional range of time stamps and/or message identifications. It also allows all messages corresponding to a given GUID with an optional range of time stamps and or message identifications to be purged from the underlying log database 64.

Figure 4:
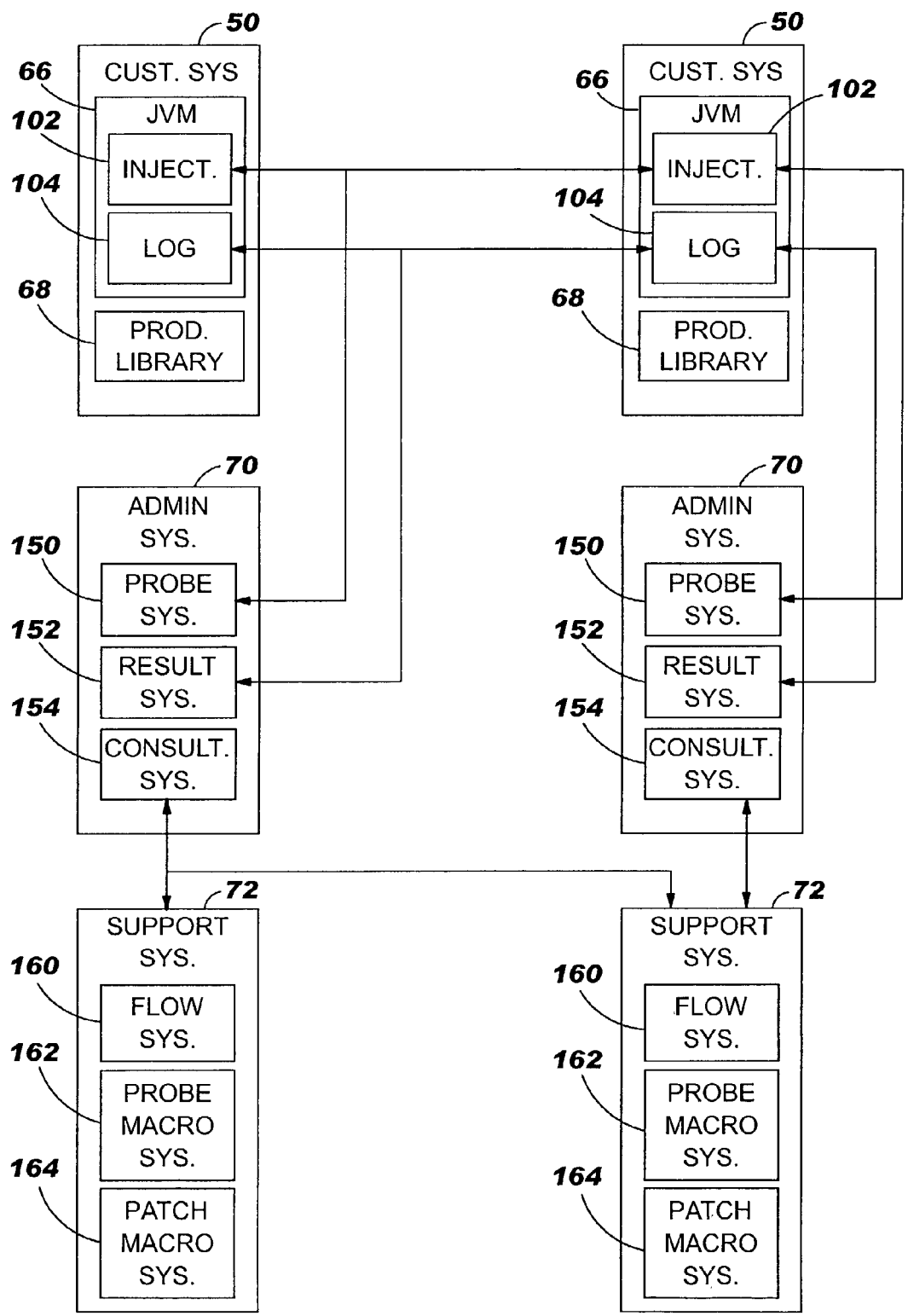
FIG. 4 depicts the customer system of FIG. 2 in communication with an administrator system and a support system, according to the present invention.

Referring now to FIG. 4, a more detailed diagram of the interaction between customer system 50, administrator system 70 and support system 72 is shown. It should be noted that not all components of systems 50, 70 and 72 have been shown for brevity purposes. For example, class loader 100 and databases 62 and 64 have not been shown for customer system 50, but should be recognized to exist. FIG. 4, among other things, demonstrates that a single administrator system 70 could communicate with one or more customer systems 50 and support systems 72. In general, when a program on customer system 50 malfunctions, a customer administrator (not shown) using an administrator system 70 will attempt to identify and solve the problem. As indicated above, this could involve injecting probes and reviewing trace data. However, administrator system 70 also has the option to consult with support system 72, which has one or more knowledge bases of work flows, problem determination probes, instructions and/or patches for implementation on customer system 50. For example, if a particular problem is being experienced by customer system 70, consultation system 154 could be used to obtain a work flow from flow system 160 of support system 72. The work flow could designate a series of steps or actions that should be taken to identify and address the problem. To this extent, the work flow could identify a set of probes that should be inserted for testing the program. Once the work flow is established, probe macro system 162 could be used to provide the actual probes and rules to administrator system 70 for implementation on customer system 50. As described above, the probes and rules would be fed to injection system 102 by probe system 150 and then inserted into the appropriate classes as bytecode. Once the classes are run with the probes inserted, and trace data is generated, result system 152 would access log system 104 to retrieve and analyze the data. To this extent, consultation system 154 could be further used to share the retrieved data to seek advice from support system 72.

In the event a specific problem is identified, support system 72 may have a patch for temporarily correcting the problem. In this case, patch macro system 162 could communicate the patch to administrator system 70, which would implement the patch in the same manner that probes were inserted. Specifically, the patch and rules would be received by injection system 102. Class recognition logic could be generated based on the rules, and then the logic and patch would be compiled into bytecode. The patch bytecode would then be inserted into the appropriate classes identified by the rules/logic.

Referring now to FIG. 5, a method flow diagram 200 according to the present invention is shown. As depicted, first step 202 is to receive problem determination probes and associated instructions on a computerized system for storage in a fragment database. Second step 204 is to activate the problem determination probes in the fragment database. Third step 206 is to identify program classes into which the problem determination probes should be inserted based on the instructions. Fourth step 208 is to insert the activated problem determination probes into the identified program classes while the computerized system is running. Fifth step 210 is to execute the program classes with the inserted problem determination probes to generate trace data.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls customer system 50 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A problem determination method, comprising:
    receiving problem determination probes and associated instructions on a computerized system;
    activating the problem determination probes in a fragment database;
    identifying program classes into which the problem determination probes should be inserted based on the instructions;
    inserting the activated problem determination probes into the identified program classes while the computerized system is running; and
    executing the program classes with the inserted problem determination probes to generate trace data.

2. The method of claim 1, further comprising:
    generating class recognition logic based on the instructions;
    compiling the problem determination probes and the class recognition logic into virtual instructions; and
    storing the compiled problem determination probes, the instructions and the class recognition logic in the fragment database prior to the identifying step, wherein the program classes are identified based on the compiled class recognition logic.

3. The method of claim 2, wherein the identifying step comprises:
    querying the fragment database to identify unloaded program classes into which the activated problem determination probes should be injected; and
    using the compiled class recognition logic to identify pertinent loaded program classes into which the activated problem determination probes should be injected.

4. The method of claim 1, further comprising:
    storing the generated trace data in a log database; and
    accessing the log database to analyze the trace data.

5. The method of claim 1, further comprising:
    deactivating the activated problem determination probes in the fragment database; and
    removing the problem determination probes from the program classes and the fragment database.

6. A problem determination system, comprising:
    an injection system having a storage system for storing problem determination probes and associated instructions in a fragment database, and an activation system for activating the stored problem determination probes;
    a class loader having a query system for querying the fragment database to identify unloaded program classes into which the problem determination probes should be injected, and an insertion system for inserting the activated problem determination probes into the identified unloaded classes; and
    a log system for accessing trace data in a log database, wherein the trace data is produced when program classes having the inserted problem determination probes are loaded and executed.

7. The system of claim 6, wherein the injection system further comprises:
    a logic system for generating class recognition logic based on the instructions;
    a compilation system for compiling the received problem determination probes and the class recognition logic into virtual instructions; and wherein the storage system stores the compiled problem determination probes, the instructions and the compiled class recognition logic in the fragment database.

8. The system of claim 7, wherein the compiled class recognition logic is communicated to the class loader to identify pertinent loaded program classes that lack the activated problem determination probes, and wherein the class loader further inserts the activated problem determination probes into identified loaded program classes.

9. The system of claim 8, wherein the identified loaded program classes are caused to be unloaded and reloaded for insertion of the activated problem determination probes.

10. The system of claim 6, wherein the problem determination probes include at least one of a print statement and a statement that adds troubleshooting information.

11. The system of claim 6, wherein the injection system, the class loader and the log system comprise a virtual machine loaded on a computerized customer system, and wherein the customer system is executing when the problem determination probes are inserted.

12. The system of claim 11, wherein the virtual machine is a JAVA virtual machine.

13. The system of claim 11, wherein the customer system communicates with a computerized administrator system and a computerized support system, and wherein the administrator system obtains a problem determination work flow, the problem determination probes, and patch macros from the support system for implementation on the customer system.

14. The system of claim 13, wherein the administrator system comprises:
 a probe system for communicating the problem determination probes and the patch macros received from the support system to the virtual machine;
 a result system for accessing the log database to analyze the trace data; and
 a consulting system for receiving the work flow, the problem determination probes and the patch macros from the support system.

15. The system of claim 13, wherein the support system comprises:
 a flow system for communicating the work flow to the administrator system;
 a probe macro system for communicating the problem determination probes to the administrator system; and
 a patch macro system for communicating the patch macros to the administrator system.

16. A virtual machine for problem determination, comprising
 an injection system for receiving problem determination probes and associated instructions, for generating class recognition logic based on the associated instructions, for compiling the problem determination probes and the class recognition logic into virtual instructions , for storing compiled problem determination probes, the associated instructions and the compiled class recognition logic in a fragment database, and for activating predetermined compiled problem determination probes in the fragment database;
 a class loader for querying the fragment database to identify unloaded program classes into which the compiled problem determination probes should be injected, and for and inserting the activated problem determination probes into the identified unloaded classes; and
 a log system for accessing trace data in a log database, wherein the trace data is produced when the unloaded program classes having the inserted problem determination probes are loaded and executed.

17. The virtual machine of claim 16, wherein the compiled class recognition logic is communicated to the class loader to identify relevant loaded program classes that lack the activated problem determination probes, and wherein the class loader further inserts the activated problem determination probes into the identified loaded program classes.

18. The virtual machine of claim 17, wherein the identified loaded program classes are caused to be unloaded and reloaded for insertion the activated problem determination probes.

19. The virtual machine of claim 16, wherein the virtual machine is loaded on a computerized customer system, and wherein the customer system is executing when the problem determination probes are inserted into the loaded and unloaded program classes.

20. The virtual machine of claim 19, wherein the virtual machine is a JAVA virtual machine.

21. The virtual machine of claim 19, wherein the customer system communicates with a computerized administrator system and a computerized support system, wherein the administrator system obtains a problem determination work flow, the problem determination probes, and patch macros from the support system for implementation on the customer system.

22. The virtual machine of claim 21, wherein the administrator system comprises:
 a probe system for communicating the problem determination probes and the patch macros received from the support system to the virtual machine;
 a result system for accessing the log database to analyze the trace data; and
 a consulting system for receiving the work flow, the problem determination probes and the patch macros from the support system.

23. The virtual machine of claim 21, wherein the support system comprises:
 a flow system for communicating the work flow to the administrator system;
 a probe macro system for communicating the problem determination probes to the administrator system; and
 a patch macro system for communicating the patch macros to the administrator system.

24. A program product stored on a recordable medium for problem determination, which when executed, comprises:
 an injection system having program code for storing receiving problem determination probes and associated instructions in a fragment database, and program code for activating the stored problem determination probes;
 a class loader having program code for querying the fragment database to identify unloaded program classes into which the problem determination probes should be injected, and program code for inserting the activated problem determination probes into the identified unloaded classes; and
 a log system having program code for accessing trace data in a log database, wherein the trace data is produced when program classes having the inserted problem determination probes are loaded and executed.

25. The program product of claim 24, wherein the injection system further comprises:
 program code for generating class recognition logic based on the instructions;
 program code for compiling the received problem determination probes and the class recognition logic into virtual instructions; and
 wherein the program code for storing stores the compiled problem determination probes, the instructions and the compiled class recognition logic in the fragment database.

26. The program product of claim 25, wherein the injection system further comprises program code for communicating the compiled class recognition logic to the class loader to identify pertinent loaded program classes that lack the activated problem determination probes, and wherein program code for inserting of the class loader further inserts the activated problem determination probes into the identified loaded program classes.

27. The program product of claim 24, wherein the injection system, the class loader and the log system comprise a virtual machine loaded on a computerized customer system, and wherein the customer system is executing when the problem determination probes are inserted.

28. The program product of claim 27, wherein the customer system communicates with a computerized administrator system and a computerized support system, and wherein the administrator system obtains a problem determination work flow, the problem determination probes, and patch macros from the support system for implementation on the customer system.

29. The program product of claim 28, wherein the administrator system comprises:
- a probe system for communicating the problem determination probes and the patch macros received from the support system to the virtual machine;
- a result system for accessing the log database to analyze the trace data; and
- a consulting system for receiving the work flow, the problem determination probes and the patch macros from the support system.

30. The program product of claim 28, wherein the support system comprises:
- a flow system for communicating the work flow to the administrator system;
- a probe macro system for communicating the problem determination probes to the administrator system; and
- a patch macro system for communicating the patch macros to the administrator system.

31. A problem determination method, comprising:
- receiving problem determination probes and associated rules from a computerized support system to a computerized administrator system;
- providing the problem determination probes and associated rules to a computer customer system from the computerized administrator system;
- activating the problem determination probes in a fragment database of the customer system;
- inserting the activated problem determination probes into program classes based on the instructions while the computerized customer system is running; and
- executing the program classes with the inserted problem determination probes to generate trace data.

32. The method of claim 31, further comprising:
- retrieving the trace data from a log database of the computerized customer system to the computerized administrator system;
- analyzing the retrieved trace data;
- retrieving a program patch from the computerized support system to the computerized administrator system based on the analyzed trace data; and
- implementing the retrieved program patch on the computerized customer system.

33. The method of claim 31, wherein the problem determination probes comprises at least one of a set of print statements and a set of statements that add troubleshooting information.

* * * * *